(12) United States Patent
Floersheimer

(10) Patent No.: US 10,807,554 B2
(45) Date of Patent: Oct. 20, 2020

(54) SIDE CURTAIN AIRBAG

(71) Applicant: KEY SAFETY SYSTEMS, INC., Sterling Heights, MI (US)

(72) Inventor: Stefan Floersheimer, Raunheim (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 155 days.

(21) Appl. No.: 15/766,275

(22) PCT Filed: Oct. 7, 2016

(86) PCT No.: PCT/US2016/055897
§ 371 (c)(1),
(2) Date: Apr. 5, 2018

(87) PCT Pub. No.: WO2017/062711
PCT Pub. Date: Apr. 13, 2017

(65) Prior Publication Data
US 2018/0290618 A1    Oct. 11, 2018

Related U.S. Application Data

(60) Provisional application No. 62/238,347, filed on Oct. 7, 2015.

(51) Int. Cl.
*B60R 21/232* (2011.01)
*B60R 21/214* (2011.01)
(Continued)

(52) U.S. Cl.
CPC .......... *B60R 21/232* (2013.01); *B60R 21/214* (2013.01); *B60R 21/2334* (2013.01);
(Continued)

(58) Field of Classification Search
CPC ... B60R 21/232; B60R 21/213; B60R 21/201; B60R 21/214; B60R 21/2334; B60R 2021/161; B60R 2021/21512
See application file for complete search history.

(56) References Cited

U.S. PATENT DOCUMENTS 6,889,999 B2 * 5/2005 Dominissini ......... B60R 21/201
                                                        280/730.2
7,597,345 B1    10/2009 Kim
                    (Continued)

FOREIGN PATENT DOCUMENTS

EP    1674349 A1    6/2006
EP    2149480 A1    2/2010
                (Continued)

OTHER PUBLICATIONS

Office Action relating to Chinese Application No. 201680071203.7, dated Apr. 3, 2020.
(Continued)

*Primary Examiner* — Karen Beck
(74) *Attorney, Agent, or Firm* — Meunier Carlin & Curfman LLC

(57) ABSTRACT

A side curtain airbag module comprises an airbag having a plurality of fastening flaps that are configured to be fastened to the body of a vehicle; a ramp to guide deployment of the airbag, the ramp has at least one fastener configured to be fastened to a vehicle body; means for securing the ramp to the airbag by relative movement of airbag and ramp, whereby in a mounting condition of the airbag module the ramp fasteners are at least in part housed by the airbag flaps.

15 Claims, 7 Drawing Sheets

(51) Int. Cl.
*B60R 21/2334* (2011.01)
*B60R 21/16* (2006.01)
*B60R 21/215* (2011.01)

(52) U.S. Cl.
CPC .............. *B60R 2021/161* (2013.01); *B60R 2021/21512* (2013.01)

(56) References Cited

U.S. PATENT DOCUMENTS

| | | | | |
|---|---|---|---|---|
| 7,699,343 | B2* | 4/2010 | Kwak | B60R 21/213 280/728.2 |
| 9,315,169 | B2* | 4/2016 | Vinssac | B60R 21/213 |
| 9,487,175 | B2* | 11/2016 | Noma | B60R 21/201 |
| 10,005,419 | B2* | 6/2018 | Konaka | B60R 21/237 |
| 2006/0043703 | A1* | 3/2006 | Enriquez | B60R 21/213 280/730.2 |
| 2007/0024031 | A1* | 2/2007 | Coleman | B60R 21/213 280/728.2 |
| 2008/0007034 | A1* | 1/2008 | Downey | B60R 13/025 280/730.2 |
| 2008/0122203 | A1 | 5/2008 | Steinbach et al. | |
| 2009/0085329 | A1 | 4/2009 | Kwak | |
| 2009/0184494 | A1* | 7/2009 | Dominissini | B60R 21/217 280/728.2 |
| 2011/0215556 | A1* | 9/2011 | Higano | B60R 21/213 280/730.2 |
| 2012/0119048 | A1* | 5/2012 | Kim | B60R 21/213 248/309.1 |
| 2013/0161930 | A1* | 6/2013 | Moffitt | B60R 21/232 280/730.2 |
| 2017/0247008 | A1* | 8/2017 | Witt, Jr. | B60R 21/213 |

FOREIGN PATENT DOCUMENTS

| | | | |
|---|---|---|---|
| JP | 2002-053005 A | 2/2002 | |
| JP | 2002-127862 A | 5/2002 | |
| JP | 2002-362288 A | 12/2002 | |
| JP | 2006-175920A A | 7/2006 | |
| JP | 2008-521684 A | 6/2008 | |
| JP | 2008279944 | 11/2008 | |
| JP | 2009-078717 A | 4/2009 | |
| WO | WO-2017062711 A1 * | 4/2017 | ........... B60R 21/214 |

OTHER PUBLICATIONS

English Translation of Office Action, in connection to Japanese Application No. 2018-517869, dated Aug. 12, 2020. 6 pages.

* cited by examiner

SIDE CURTAIN AIRBAG

BACKGROUND AND SUMMARY OF THE INVENTION

The present invention relates to a side curtain airbag (CAB) module that is provided with means for fixing the air bag to the structure of a vehicle. In greater detail, the present invention relates to a CAB module including a ramp bracket for said curtain airbag and to the way the ramp is connected to the airbag to improve handling of the CAB assembly.

Side curtain airbags provide cushioning between vehicle occupants and the doors and windows of a vehicle during lateral impacts; to this purpose they are housed under the trim parts of the vehicle, above the lateral windows, and are usually held in part by a ramp. The ramp is used to guide the deployment of the airbag, during its actuation, into the correct direction. The ramp is generally intended for the B pillar and the C pillar of the vehicle. In the present invention, reference will be made to a C-ramp without intending to limit to this embodiment.

The airbag is connected to the vehicle by means of flaps, i.e. protruding parts of the air bag generally having a hole for passing means fastening the air bag to the vehicle; an example of a curtain air bag having securing flaps is disclosed e.g. in U.S. Pat. No. 7,261,316.

The C-ramp is connected to the vehicle structure by fastening means such as screws or rivets that pass through lateral C-ramp fasteners into the vehicle structure.

A problem with known CAB assemblies is that of making easier and quicker the step of mounting the assembly at the customer production line. Known solutions use additional fixation elements to combine the ramp with the airbag, however, said additional fixation elements represent an additional cost both per se and as labour time. Moreover, the fixation elements should not interfere with the mounting step on the vehicle.

It is an aim of the present invention to solve the above problems and to provide a connection between the airbag cushion and the C-ramp with a reduction on cost and time impact with respect to known systems. Further aims of the invention are to provide a CAB module that is easy to handle in mounting steps and also during handling of the module, e.g. in packaging, transportation steps.

Said aims are reached by means of the present invention that relates to an airbag module according to claim 1. Preferred aspects are recited in the dependent claims.

The invention relates to a side curtain airbag module having means to fasten the module to a body of a vehicle, the airbag module comprising: an airbag; a plurality of fastening flaps associated to said airbag, said flaps being configured to be fastened to the body of said vehicle; at least one ramp to guide deployment of the airbag, said ramp having at least one fastener extending from the ramp and configured to be fastened to said vehicle body; wherein in a mounting condition of the airbag module said ramp fasteners are at least in part housed by said airbag flaps and wherein said module further comprises means for securing the ramp to the airbag by relative movement of the airbag and ramp.

By the mentioned housing, i.e. engagement, of airbag and ramp by means of a relative movement, the invention solves the problem of preventing the flaps from slipping off the C-ramp's fasteners.

In a preferred embodiment of the present invention the securing means comprises a slot located in the ramp and a tab provided in the airbag, the tab is configured to be inserted in said slot.

In an exemplary embodiment, the tab of the airbag has a slit and the ramp comprises a protruding portion adjacent to said ramp slot, that is suitable to be introduced in the slit of the tab.

According to another aspect of the present invention, the ramp's fasteners comprise a portion configured to engage a matching part of the airbag flaps, whereby said fastener is engaged with said flap by a rotational relative movement.

More in detail, the ramp fasteners have a first portion adjacent to the ramp body and a second portion spaced from the ramp body, whereby the transverse dimension of the second portion of a fastener is greater than the transverse dimension of the first portion of the ramp fastener and the part of said airbag flaps that is housing said fasteners is shaped to substantially correspond to at least said first portion of the fasteners. In other words, both the fastener and the flap have a neck that holds the fastener to the flap. The fastener can be engaged with and disengaged from the flap by a rotational movement, by which the larger part of the fastener is inserted in the flap through the neck along an angled direction; the fastener is subsequently rotated to position the fastener's neck in correspondence to the flap's neck.

In this position there is provided a secure fastening (i.e. an engagement) of fastener and flap; it is in fact not possible to disengage fastener from flap by a mere relative rectilinear movement of flap and fastener, such as may happen when handling the module.

According to a further aspect of the present invention, said airbag flaps are woven or sewn to provide pockets for housing said ramp fasteners; in another exemplary embodiment, the flaps have two slits having different length, the fastener is inserted in both said slits by a movement that is at least in part a rotational movement.

The airbag module of the present invention provides several advantages over the prior art. In fact, an airbag module is provided that can be handled without the need of fixing the airbag to the ramp by additional fasteners. The use of the flaps and the fasteners provided with a "neck" results in a module that solves the problem at substantially low additional costs. Moreover, the fastening means of the present invention do not have to be removed from the module after said module has been mounted on the vehicle.

In other words, the present invention introduces a new design of the ramp fasteners and of the cushion slots so that the C-ramp fasteners are designed as hooks that will secure the cushion airbag stably enough for transportation and handling without using further fixing means.

Advantages and features of the present invention will be more apparent from the description below, provided with reference to the exemplary and non-limiting accompanying drawings, in which:

DETAILED DESCRIPTION OF THE DRAWINGS

Figure 1:
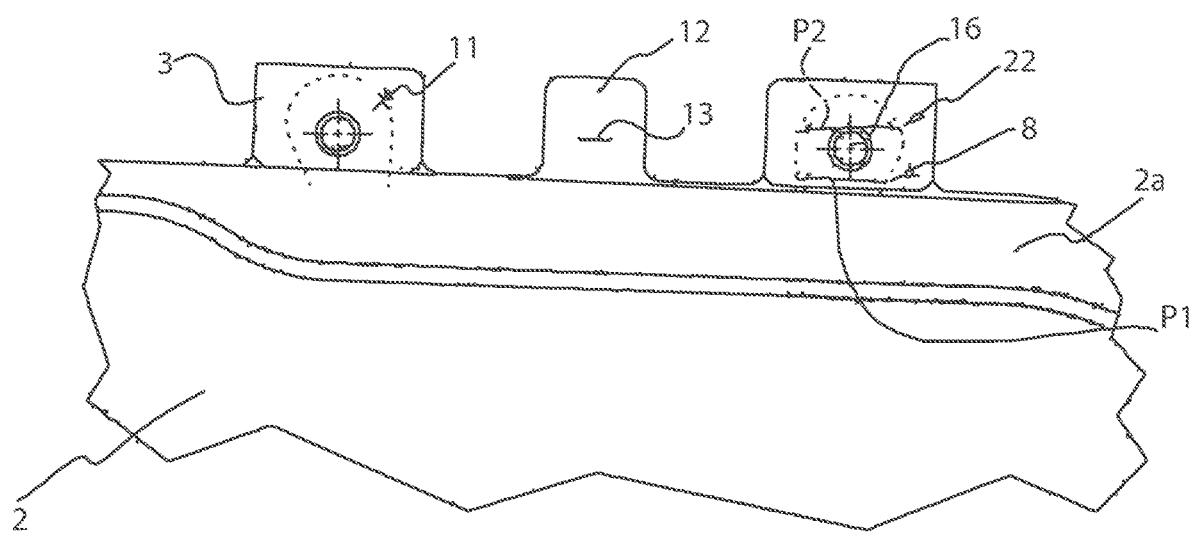
FIG. 1 shows a portion of a side curtain airbag to be engaged with a ramp according to the present invention.
Figure 2:
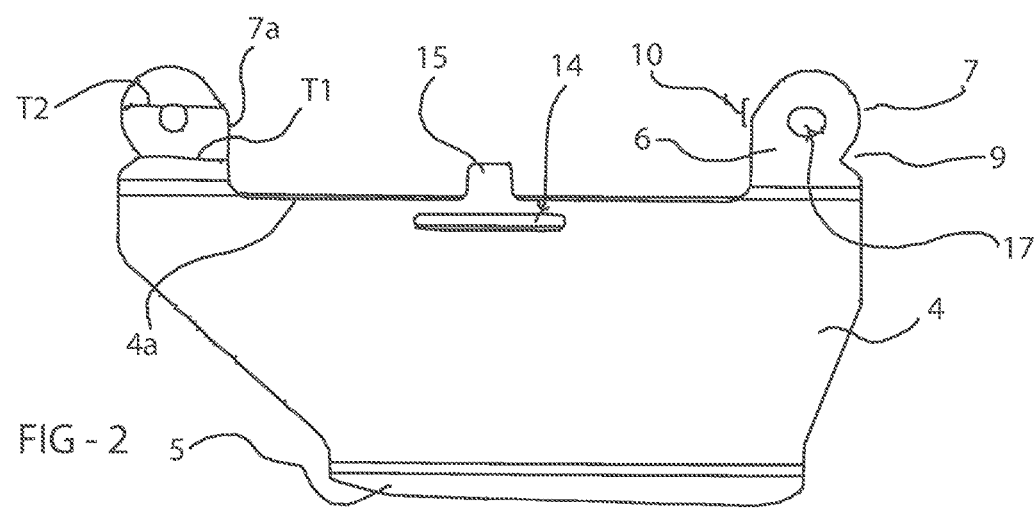
FIG. 2 shows a ramp for use with the airbag of FIG. 1.
Figure 3:
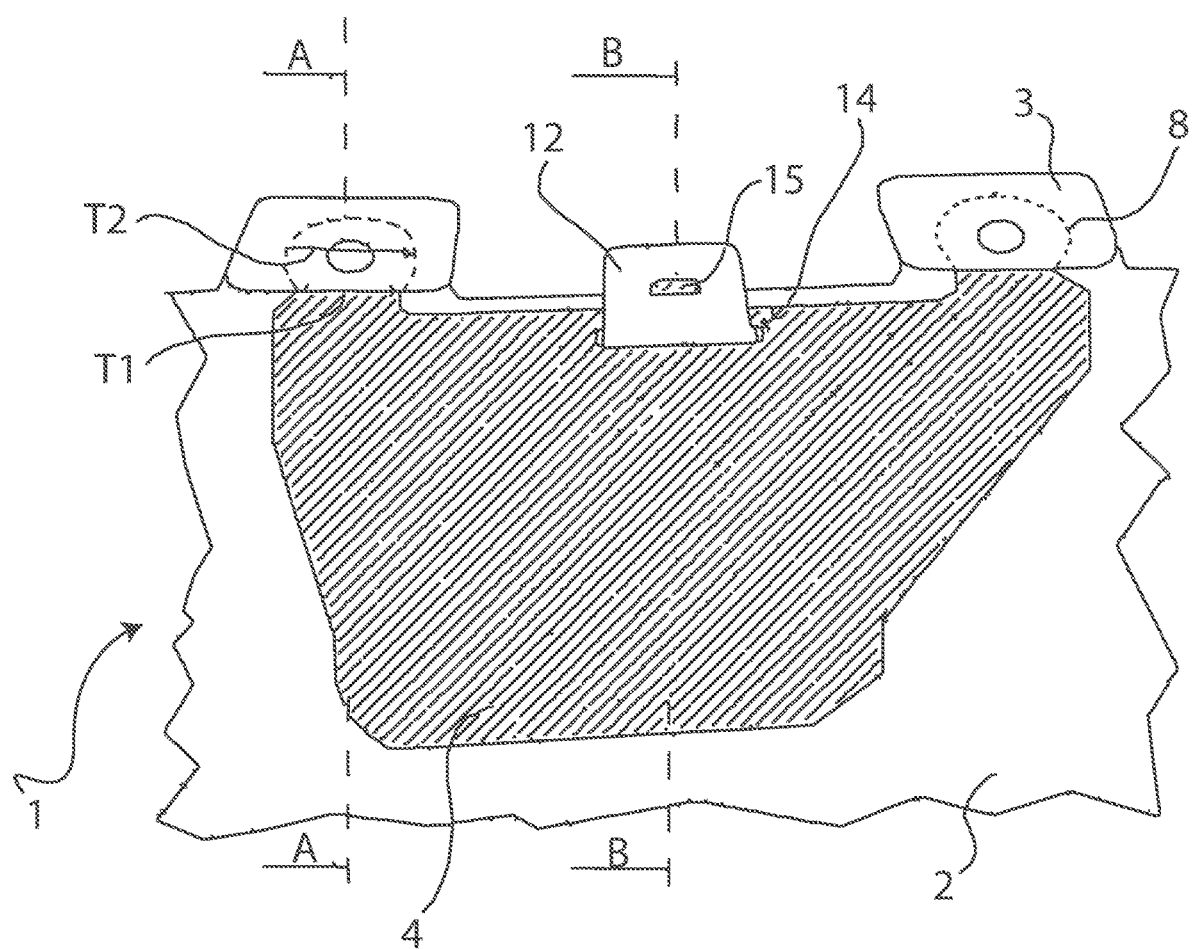
FIG. 3 shows a ramp and an airbag portion of FIGS. 1 and 2 in an assembled configuration.

An exemplary side curtain airbag module 1 of the invention is schematically shown in FIGS. 1-3. The module comprises an airbag 2 and a ramp 4. Airbag module 1 includes means of connection between the airbag 2 and the C-ramp 4; exemplary means of connection in the airbag 2 comprise a plurality of fastening flaps 3 and at least one tab 12. According to an exemplary embodiment of the invention, said means of connection comprise two fastening flaps 3 and a central tab 12, used to secure the airbag 2 to the C-ramp shown in FIG. 2 during handling, transportation and assembly.

FIG. 2 shows a ramp 4 according to the present invention; the shown ramp is a C-ramp, it is however clear that any ramp may be used in the invention, independently on the pillar of the ramp. For sake of simplicity, the following description and drawings will make use of a C-ramp.

Figure 6:
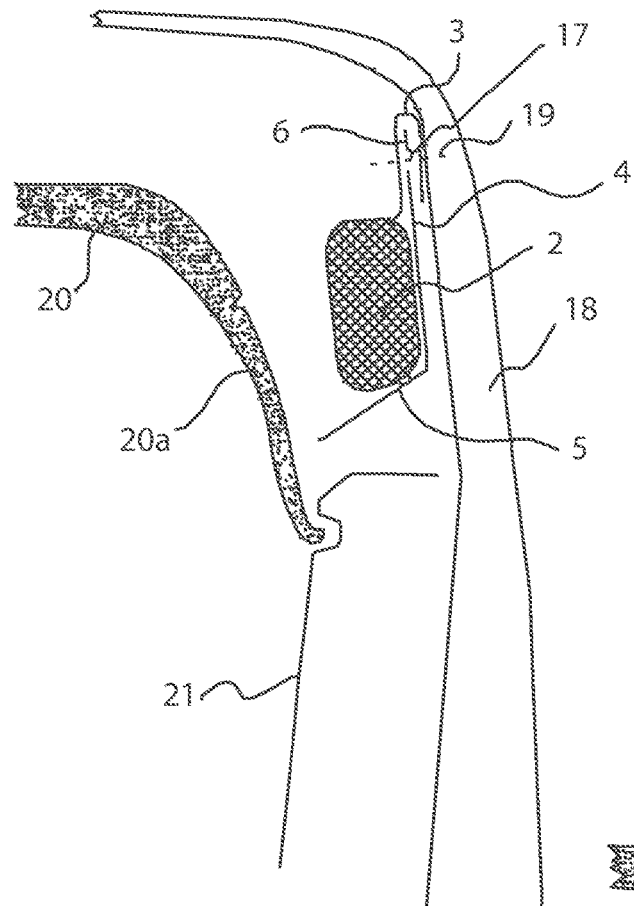
FIG. 6 shows a schematic view of section A-A of FIG. 3.
Figure 7:
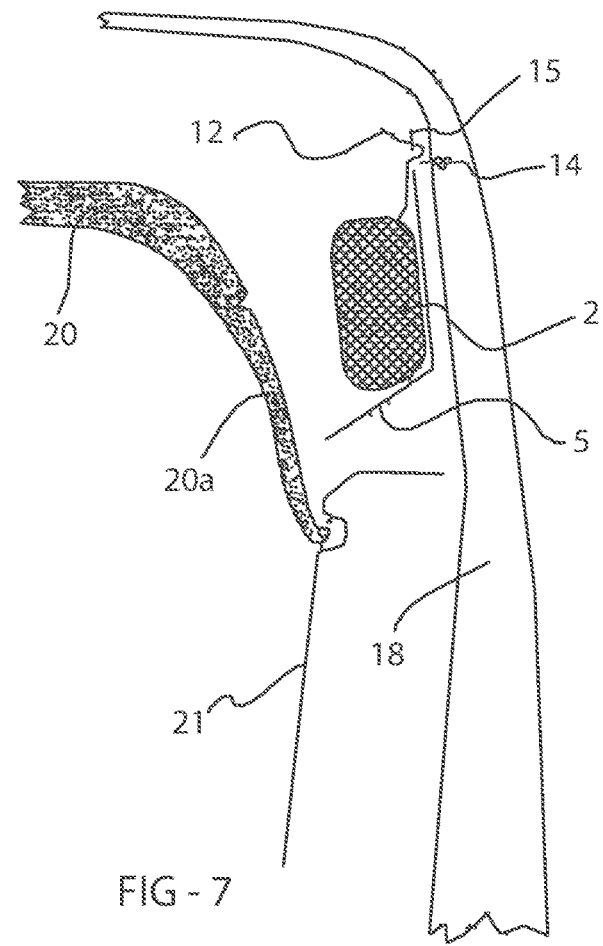
FIG. 7 shows a schematic view of section B-B of FIG. 3.

Ramp 4 has an inclined guide part 5 that guides the correct deployment of the airbag 2 when the airbag is actuated in a way known per se in the art. Ramp 4 comprises means of connection to the vehicle structure 18, as shown in FIGS. 6 and 7 that comprise a plurality of ramp fasteners 6. Fasteners 6 have a hole 16 that will house a rivet or a screw or a clip 19 (see FIG. 6) for securing the ramp, and the airbag, to the vehicle's structure.

Ramp 4 includes means of securing the ramp to the airbag 2. In an exemplary embodiment, the same fasteners 6 used for fixing the ramp to a vehicle's structure are also used to secure the ramp to airbag flaps 2. Ramp 4 includes a slot 14 (FIG. 2); slot 14 is designed to be engaged by a tab 12 that is a protruding part of the airbag. The airbag 2 can be secured to ramp 4 by coupling the means of connection described above, by a rotational relative movement, according to the present invention. To secure a fastener 6 to a flap 3, the mentioned rotational movement is carried out in the plane of the fastener and the flap; to secure the tab 12 to the ramp, the mentioned rotational movement is carried out transversally to the plane of the ramp (FIG. 7).

To secure tab 12 to ramp 4, the ramp has a protruding element or portion 15 that extends from ramp's edge 4a in correspondence and adjacent to slot 14. Tab 12 has a slit 13 suitable to be engaged by portion 15 of the ramp. As visible in FIG. 7, to secure tab 12 to the ramp, tab 12 is inserted into slot 14 of the ramp, so that it is located on the other side of the ramp with respect to airbag 2; tab 12 is then rotated back to the side of the ramp where airbag 2 is located and portion 15 of the ramp is inserted in slit 13 of tab 12. FIG. 7 shows an assembled condition of the tab and the protruding portion of the ramp.

Concerning the securing of flaps 3 to fasteners 6 of the ramp, as above mentioned, flaps 3 and fasteners 6 have a neck to restrain rectilinear movement of fasteners 6 into and from the flaps. A rotational movement is possible, at the end of which the fastener is secured to the corresponding flap 3; in the secured condition, a fastener 6 is at least in part housed by the corresponding flap 3, as is visible in the attached drawings.

With reference to the exemplary embodiment of FIGS. 1 and 2, airbag fastening flaps 3 comprise a woven or sewn matching part 8 that provides pockets 11 for housing ramp fasteners 6. Ramp fasteners 6 have a first portion 9 adjacent to the ramp body and a second portion 10 spaced from the ramp body. T1 and T2 define two widths of the fastener at different locations, whereby the transverse dimension T2 of the second portion 10 of a fastener is greater than the transverse dimension T1 of the first portion 9 of the ramp fasteners 6.

The first portion 9 represents the "neck" of the fastener; the fasteners are thus provided with a neck 9 and with a resulting projecting portion 7 located on the fastener, externally to the neck with respect to the edge 4a of ramp 4. The protruding portion 7 acts a retaining means, or hook, once the fastener has been housed in the flap 3 and is retained therein. Opposite neck portion 9 the other side of the fastener is preferably provided a rectilinear portion 7a that preferably extends from edge 4a of the ramp to a distance corresponding to the protruding portion 7.

According to an exemplary embodiment of the invention, transverse dimension T1 is about 23 mm, transverse dimension T2 is about 25 mm, the internal edge of the ramp fastener 6 is vertical to the ramp body, while the external edge, at the neck 9, is inclined about 45°.

The airbag pocket 11 that houses ramp fastener 6, is shaped to substantially corresponding to at least the first portion 9 of the ramp fasteners 6. Accordingly, also the pockets 11 are provided with a first portion 8 adjacent to the body 2a of airbag 2 and having transverse dimension (i.e. width) P1, and with a second portion 22 spaced from portion 8 towards the end of flap 3, having transverse dimension (width of the pocket) P2. In accordance to the structure of the corresponding fastener, P2 is greater than P1 to prevent the fastener from slipping out of the pocket. As mentioned, the pocket should have a neck; it is not required that the shape of the pocket is exactly corresponding to the shape of the fastener.

The ramp's fastener may have any suitable shape that would result in the retaining effect against slipping off of the fastener from the flap of the airbag. According to a further aspect of the invention, airbag 2 (i.e. the airbag cushion) can be manufactured with OPW (one piece woven) technique rather than by sewing. In such a case, the flap with the interface design for the ramp's fastener can be built as well by OPW technique for each possible design. OPW is known per se in the art of airbag manufacture.

Figure 9:
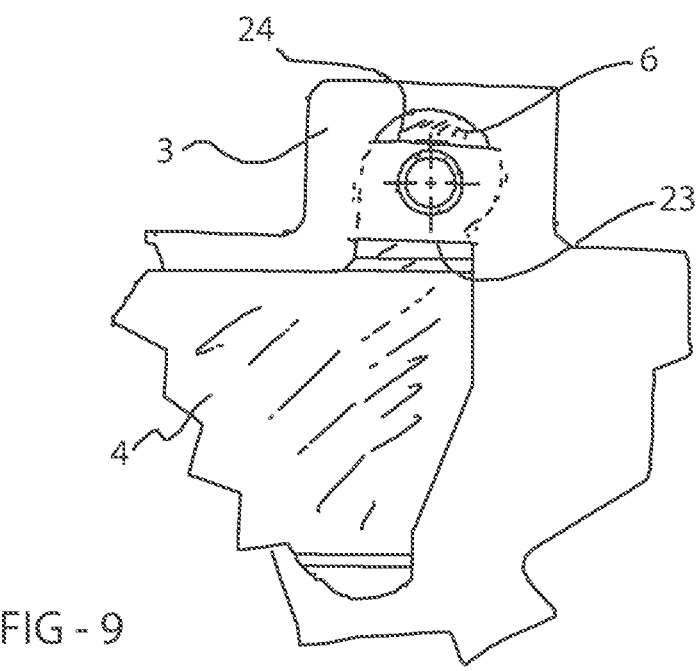
Figure 10:
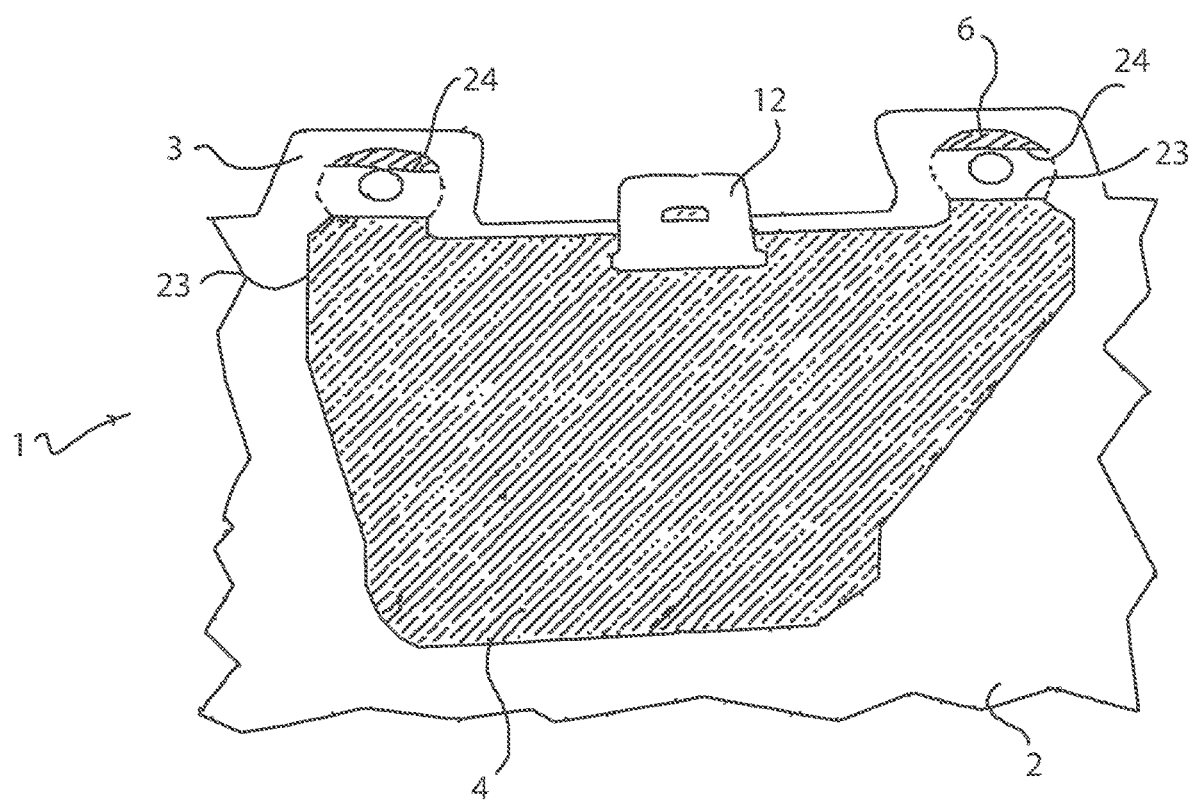
FIG. 10 shows a view of an assembled module according to the embodiment of FIGS. 8 and 9.
Figure 11:
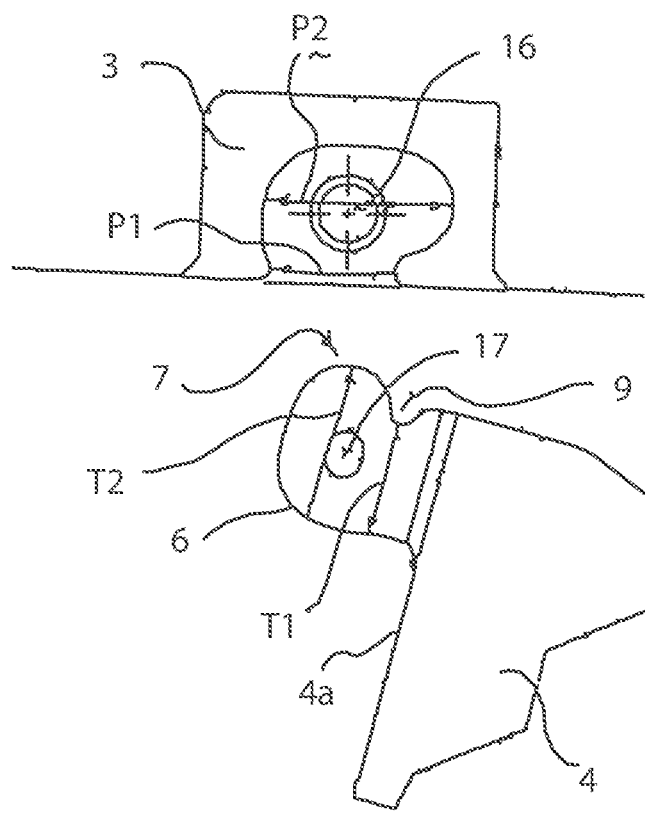
FIGS. 11 and 12 show two steps of assembling the airbag to the ramp according to a further embodiment of the invention.
Figure 12:
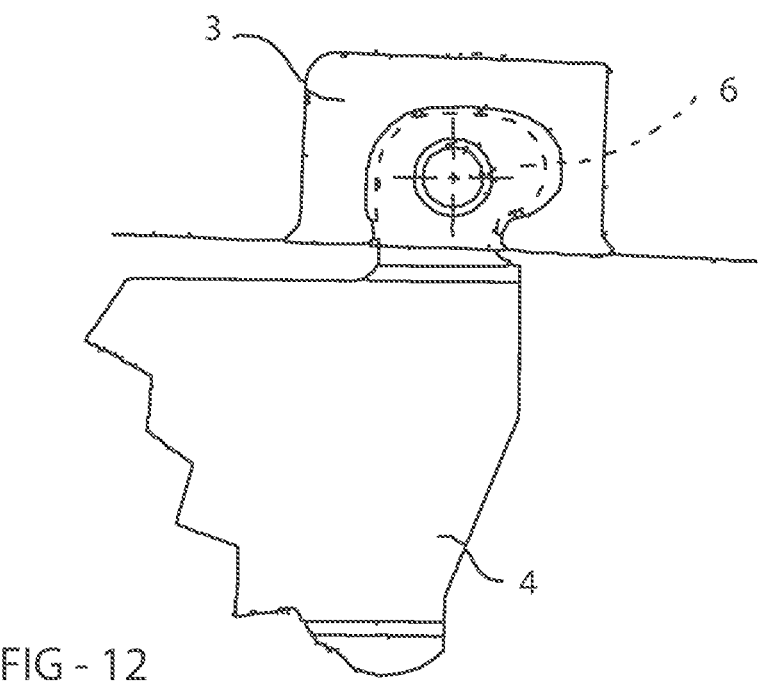

FIGS. 11 and 12 show another embodiment of the invention in which similar parts have been referred to with the same numbers as in the embodiment of FIGS. 1-10. In the embodiment of FIGS. 11-12, the width T2 of fasteners 6 and the width P2 of the pocket 11 of flap 3 are greater than the corresponding T2 and P2 in the embodiment of FIG. 2. Fasteners 6 of this embodiment are more hook-like than the previously disclosed ones. In this embodiment, the airbag, including the flaps, is obtained by OPW technique.

Airbag fastening flaps 3 also comprise central holes 16 in correspondence with central holes 17 of the ramp fasteners, so that when airbag 2 and ramp 4 are secured to each other, screws or rivets passing through holes 16 and 17 join the side curtain airbag module 1 to the vehicle structure.

FIG. 3 shows the airbag 2 and the ramp 4 secured to each other by coupling the means of connection described above. Accordingly to the exemplary embodiment shown in FIG. 3, the fastening flaps 3 and the ramp fasteners 6 are designed with a specular symmetry with respect to the symmetry line passing through B-B. The engagement of airbag flap 3 with ramp fasteners 6 may preferably be obtained by a rotational relative movement as shown in FIGS. 4-5 and 11-12. As mentioned above, the transverse dimension T2 of the second portion 10 of ramp fastener 6 is greater than the transverse dimension of the "neck" 8 (i.e. of the first portion) of airbag pocket 11. For this reason, a relative rotation between airbag 2 and ramp 4 is required in order to correctly insert ramp's fastener 6 into the pocket 11 of the airbag fastening flap 3. In the exemplary embodiment of the shown figures, the rotation angle is about 45 degrees. Other angles may be chosen in view of the design of the fasteners and the flaps.

It is possible to connect stably the airbag cushion with the C-ramp as follows: Place the airbag cushion horizontally with the flaps on the top. Rotate the ramp from the horizontal position of about 45°. Insert the first ramp fastener 6 into the flap's pocket by translating the ramp. Rotate again the ramp to the original horizontal position. Stretch the airbag until the second ramp flap can be inserted into the correspondent cushion slot. Insert the central tab 12 into the central ramp slot 14 and the correspondent ramp portion 15 into the cushion slit 13 in order to realize the connection for the central support element. In another exemplary aspect of the invention, the central tab 12 may also be fixed to the central ramp slot before engaging the fasteners 6 to flaps 3, i.e. the above sequence is inverted.

Figure 5:
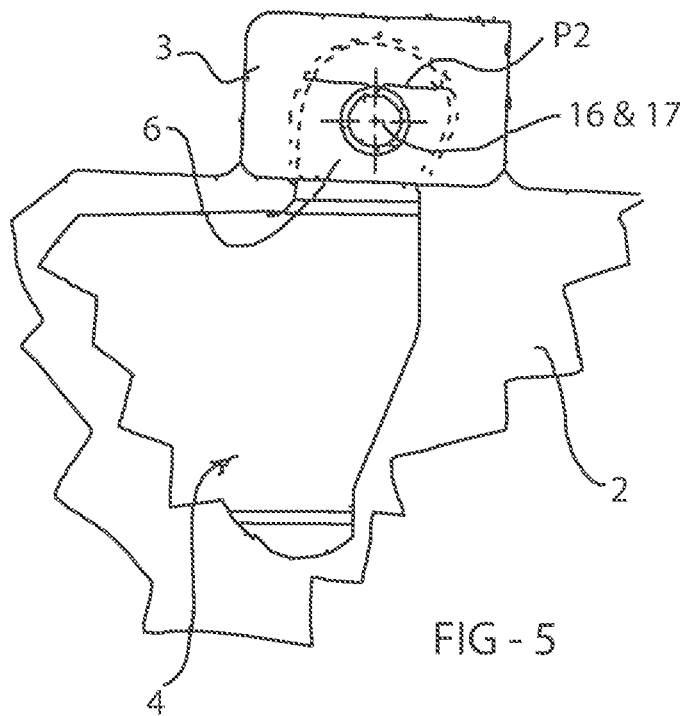

Once ramp fastener 6 is inserted into airbag pocket 11, ramp 4 and airbag 2 can be realigned as shown in FIG. 5. In the aligned position, holes 17 of the ramp fasteners 6 and holes 16 of the airbag fastening flaps 3, are centered, i.e. substantially superimposed to each other, to allow the clips or screws or retaining/fastening means 19 to be passed through. Airbag flaps 3 may have no holes 16, if the rivet or screw or other fastening means is suitable to perforate the fabric of the airbag during the mounting step.

The above steps are repeated for securing together the remaining airbag fastening flap 3 and ramp fastener 6 so that, when the airbag 2 is mounted on the ramp 4, a tension may be provided between the two fastening flaps 3 for better holding the airbag in place during handling, transportation and assembly. In this case, preferably the flap's 3 stitching follows the design of the ramp described above, so that when the ramp is inserted in the airbag slot, it causes a light stretching of the cushion fabric that maintains the airbag in a desired stable position during transportation and assembly.

FIG. 6 shows a schematic view of section A-A of FIG. 3. In this view it is represented the connection between the airbag fastening flap 3, the ramp's fasteners 6 and the vehicle structure 18 by a mean of connection such as passing screw or rivet 19.

FIG. 7 shows a schematic view of section B-B of FIG. 3. In this view it is represented the connection between the airbag tab 12 and the ramp slot 14 and the ramp protruding portion 15 with the airbag slit 13. The ramp 4 is located in a position known in the art, above pillar trim 21 and such as to direct the inflating airbag towards the lower, bendable portion 20a of roof liner 20.

Figure 8:
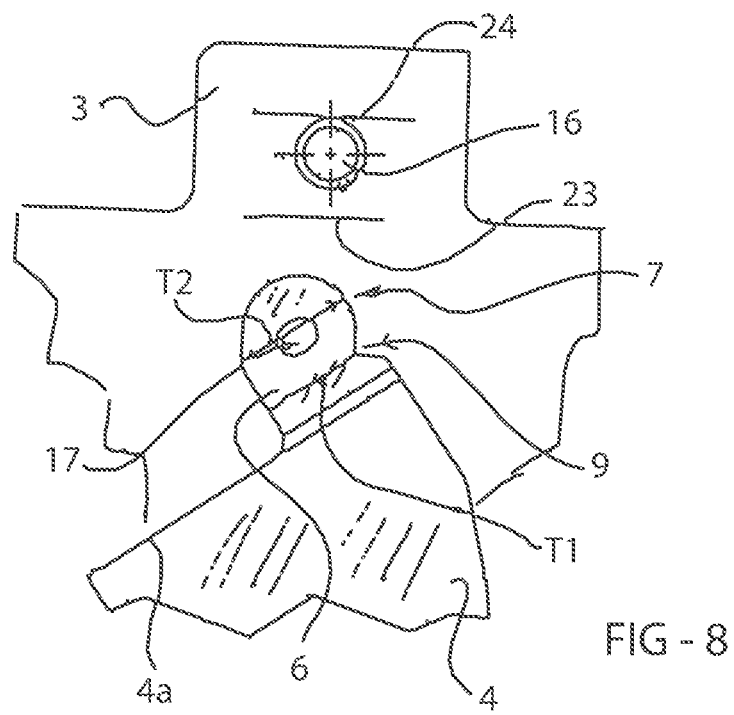
FIGS. 8 and 9 show two steps of assembling the airbag to the ramp according to a further embodiment of the invention.

FIGS. 8 to 10 show another exemplary embodiment of the invention. According to this embodiment, flap pockets 11 are replaced by two slits 23, 24 wherein ramp fastener 6 may be inserted. Slits 23 and 24 are spaced apart of a distance that takes into consideration the distance between T1 and T2 of the fasteners; preferably, slits 23 and 24 are parallel to each other. According to this embodiment, there is no need for sewing pockets 11, but it is sufficient to provide the cuts or slits 23, 24 on the airbag flaps 3, which will act as housing and retaining means for the fasteners 6 of the ramp. As already described in the solution comprising the flap pockets 11, also this embodiment comprising slits 23, 24 realizes a connection between the airbag 2 and the ramp 4 by rotational movement.

Figure 4:
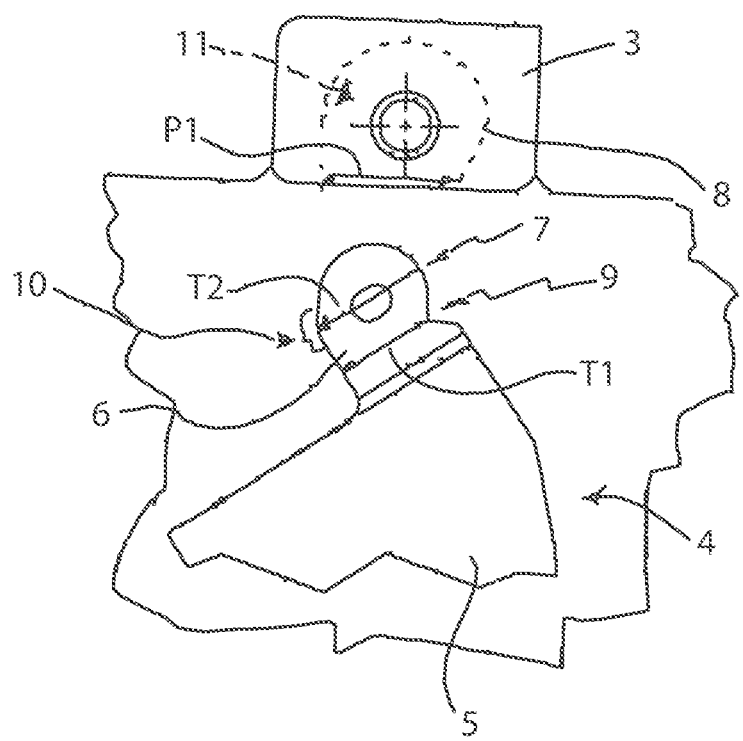
FIG. 4 and FIG. 5 show two steps of the process of securing the airbag to the ramp.

In order to retain the hook-like portion 7 of the fastener 6, the dimension of the lower slit 23 is smaller than the maximum width T2 of the fastener 6 and big enough to substantially house the neck 9 of the fastener 6; in a preferred embodiment, the dimension of slit 23 may correspond to the dimension P1 of the entrance of pocket 11 in FIGS. 4-5. Therefore, the fastener 6 cannot slip out of the slit 23 during transportation and assembly. The way of mounting the assembly of airbag and ramp to the vehicle structure 18 is the same as the one disclosed with reference to FIGS. 6-7, e.g. by means of connection such as passing screw or rivet or a clip 19 through central holes 16 and 17.

It should be noted that in this embodiment (see FIG. 9) the fastener 6 is inserted in both slits 23 and 24, so that fastener 9 is housed by the flap 3 of the airbag.

In the preferred embodiment, shown in the above discussed figures, the assembly has flaps housing at least in part the ramp's fasteners 6 and a combination of tab 12, slot 14 and protruding part 15 located between the flaps 3.

In general, the invention may be carried out by using the central connection element formed by the slot 14, the tab 12 and the tab's protruding part 15 with no further connection elements. In another exemplary embodiment, the airbag is connected to the ramp by means of two lateral flaps provided with passing holes, without having a central tab and a central slot.

Many changes and modifications in the above-described embodiment of the invention can, of course, be carried out without departing from the scope thereof. Accordingly, that scope is intended to be limited only by the scope of the appended claims.

The invention claimed is:

1. A side curtain airbag module having means to fasten the module to a body of a vehicle, the airbag module comprising:
   an airbag;
   a plurality of fastening flaps associated to said airbag, said fastening flaps being configured to be directly fastened to the body of said vehicle;
   at least one ramp to guide deployment of the airbag, said ramp having at least one fastener configured to be directly fastened to said vehicle body;
   wherein said airbag module further comprises means for securing the ramp to the airbag by relative movement of airbag and ramp, whereby in a mounting condition of the airbag module said fasteners of the ramp are at least in part housed by said fastening flaps.

2. A side curtain airbag module according to claim 1, wherein said securing means comprises at least a slot located in said ramp and the airbag has a tab that is insertable in said slot.

3. A side curtain airbag module according to claim 2, wherein said tab has a slit and said ramp comprises a protruding portion insertable in said slit of the tab, said protruding portion being adjacent to said ramp slot.

4. A side curtain airbag module according to claim 1, wherein said fasteners comprise a portion configured to engage a matching part of said flaps, whereby said fastener is configured to be engaged with said flap by a rotational relative movement.

5. A side curtain airbag module according to claim 1, wherein the ramp fasteners have a first portion adjacent to the ramp body and a second portion spaced from the ramp body, whereby the transverse dimension of the second portion of a fastener is greater than the transverse dimension of the first portion of the ramp fastener and the part of said airbag flaps that is housing said fasteners is shaped to substantially correspond to at least said first portion of the fasteners.

6. A side curtain airbag module according to claim 1, wherein said airbag flaps are woven or sewn to provide pockets for housing said ramp fasteners.

7. A side curtain airbag module according to claim 5, wherein said airbag flaps are woven or sewn to provide pockets for housing said ramp fasteners.

8. A side curtain airbag module according to claim 1, wherein said fasteners comprise a portion configured to engage a matching part of said flaps, whereby said fastener is configured to be engaged with said flap by a rotational relative movement.

9. A side curtain airbag module according to claim 8, wherein said airbag flaps are provided with one or more slits and in a mounting condition said ramp fasteners are inserted in said one or more slits to engage said flaps.

10. An airbag for an airbag module including at least one ramp to guide deployment of the airbag, said ramp having a body and at least one fastener extending from the ramp body and configured to be directly fastened to a vehicle body, said airbag having a plurality of flaps configured to be directly fastened to the vehicle body, characterized in that a part of said flaps is provided with a pocket having an inlet, the width of said inlet is less than the maximum width of the pocket.

11. An airbag according to claim 10, wherein the airbag has a tab that is insertable in a slot of the ramp.

12. An airbag according to claim 10, wherein said flap has two slits.

13. A ramp for an airbag module including a ramp and an airbag, the airbag having a plurality of fastening flaps configured to be fastened to the body of said vehicle, said ramp having at least one fastener extending from the ramp to provide a means of connection to a vehicle, characterized in that the ramp comprises a slot and a protruding portion that extends from an edge of the ramp in a direction away from the ramp before and after deployment of the airbag, the protruding portion being located adjacent to and formed separately from said slot.

14. A ramp according to claim 13, wherein the fasteners of the ramp have a first portion adjacent to the ramp body and a second portion spaced from the ramp body, whereby the transverse dimension of the second portion of a fastener is greater than the transverse dimension of the first portion of the fastener.

15. A ramp for an airbag module including a ramp and an airbag, the airbag having a plurality of fastening flaps configured to be directly fastened to the body of said vehicle, said ramp having at least one fastener extending from the ramp to provide a means of direct connection to a vehicle, characterized in that the fasteners have a first portion adjacent to the ramp body and a second portion spaced from the ramp body, whereby the transverse dimension of the second portion of a fastener is greater than the transverse dimension of the first portion of the fastener.

* * * * *